United States Patent [19]

Kimura et al.

[11] Patent Number: 5,487,119
[45] Date of Patent: Jan. 23, 1996

[54] METHOD OF DETERMINING QUANTIZATION STEP IN A SUBBAND CODING SYSTEM

[75] Inventors: Shunichi Kimura; Yutaka Koshi; Koh Kamizawa, all of Ebina, Japan

[73] Assignee: Fuji Xerox Co., Ltd., Tokyo, Japan

[21] Appl. No.: 306,490

[22] Filed: Sep. 15, 1994

[30] Foreign Application Priority Data

Sep. 17, 1993 [JP] Japan ................................. 5-232074

[51] Int. Cl.$^6$ ................................................. G06K 9/36
[52] U.S. Cl. ...................... 382/239; 382/251; 358/430; 348/405
[58] Field of Search ............................... 382/239, 240, 382/248, 251; 358/430, 433; 348/398, 404, 405, 420; H04N 1/415, 7/133

[56] References Cited

U.S. PATENT DOCUMENTS

| | | | |
|---|---|---|---|
| 5,253,075 | 10/1993 | Sugiyama | 358/261.2 |
| 5,283,656 | 2/1994 | Sugahara | 358/261.1 |
| 5,327,502 | 7/1994 | Katata et al. | 382/56 |
| 5,396,567 | 3/1995 | Jass | 382/56 |

OTHER PUBLICATIONS

"Sub-Band Coding of Monochrome and Color Images", Hamid Gharavi et al., IEEE Transactions on Circuits and Systems, 35(2):207–214 (1988).

*Primary Examiner*—Leo H. Boudreau
*Assistant Examiner*—Andrew W. Johns
*Attorney, Agent, or Firm*—Finnegan, Henderson, Farabow, Garrett & Dunner

[57] ABSTRACT

An image coding method by which accurate code amount control can be performed without the necessity of recursive processing. The image coding apparatus is applied to an image coding apparatus which includes a subband division section for dividing an input image signal into a plurality of subband signals having frequency bands different from each other and having predetermined bit numbers distributed individually thereto, a subblock division section for dividing the subband signals obtained from the subband division section into a plurality of subblocks each having a spatial spread, a classification section for classifying the subband signals for each of the subblocks obtained from the subblock division section, a quantization section for quantizing the subband signals for each of the subblocks obtained from the subblock division section by linear quantization with a step width determined in response to a class outputted from the classification section and outputting a quantization index, and a code allocation section for allocating the quantization index from the quantization section as a codeword.

2 Claims, 5 Drawing Sheets

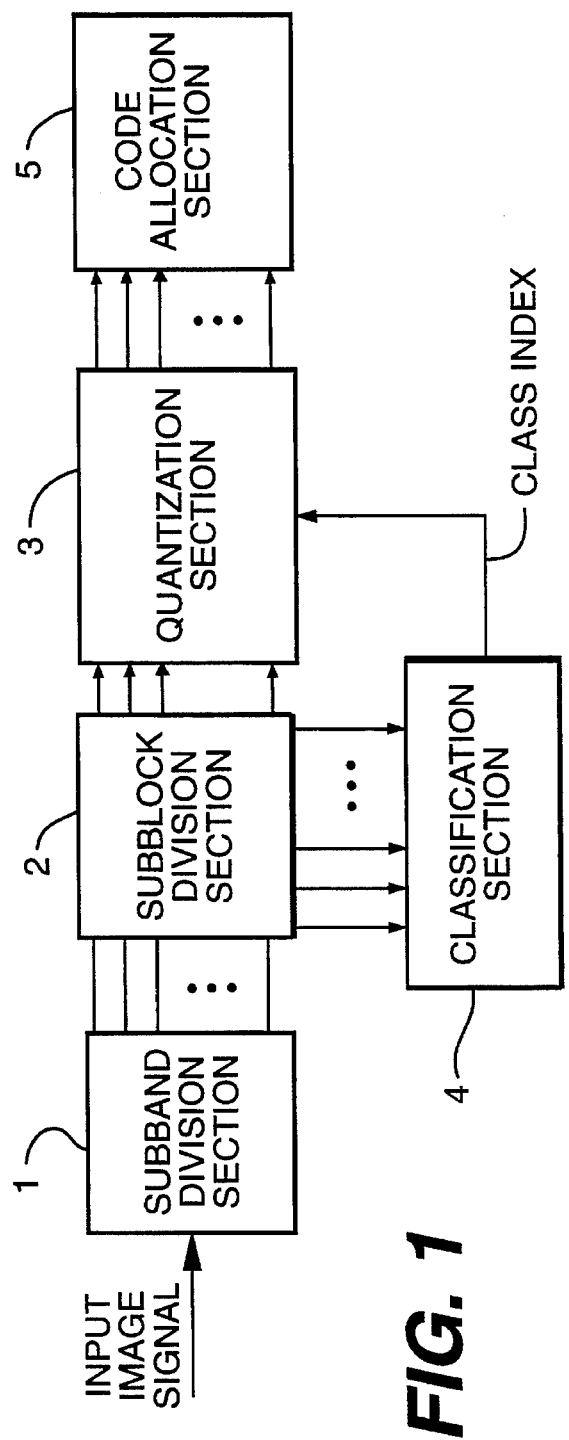
FIG. 1
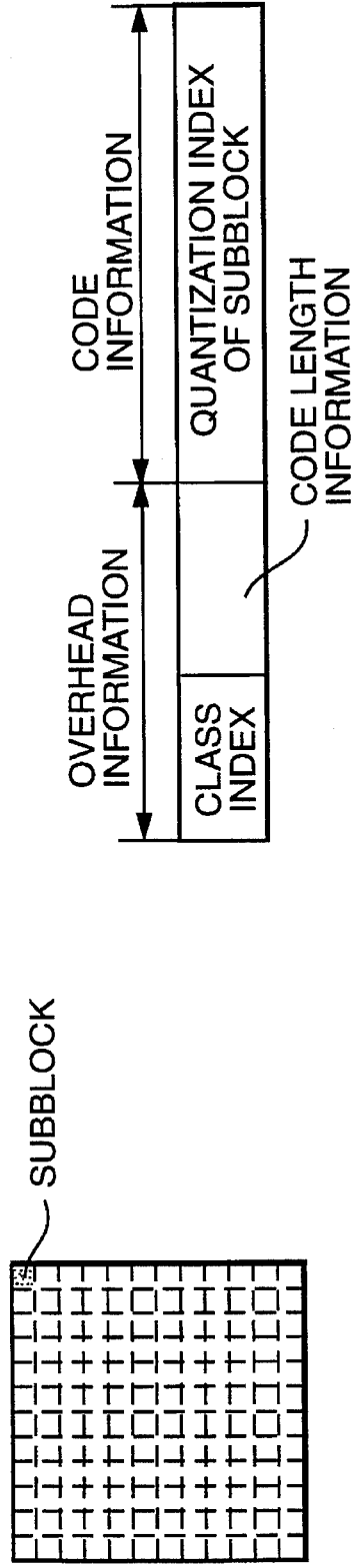
FIG. 2
FIG. 3

CONTINUED

TWO-DIMENSIONAL FREQUENCY AREA OF INPUT IMAGE

RESULT OF SUBBAND DIVISION

METHOD OF DETERMINING QUANTIZATION STEP IN A SUBBAND CODING SYSTEM

BACKGROUND OF THE INVENTION

1. Field of the Invention

This invention relates to an image coding apparatus for quantizing and coding an input image signal, and more particularly to a method of determining an optimum quantization step in an image coding apparatus.

2. Description of the Related Art

Various image coding apparatus for coding an input image signal which employ various methods are known, and one of such image coding apparatus is an image coding apparatus which makes use of subband division.

In an image coding apparatus which makes use of subband division, an input image signal is divided into a plurality of subband signals having different frequency bands from each other, and a suitable bit is distributed to each of the subbands and each of the subband signals is represented with a number of bits smaller than the number of bits of the original signal to obtain a high coding efficiency.

FIG. 7 shows the construction for performing subband division. In subband division, an input image signal S0 is divided into a plurality of signals of different frequency bands, that is, subband signals S1 and S2, by a pair of digital filters F1 and F2, respectively. Such subband division is performed for signals in a vertical direction and a horizontal direction or is performed at a plurality of stages to divide an input signal into different bands of two-dimensional frequency bands shown. In particular, frequencies of an image can be represented on a two-dimensional area as seen in FIG. 8A. The two-dimensional area is divided into a plurality of frequency areas as seen, for example, in FIG. 8B. Signals of each of the divisional frequency areas make subband signals.

Such subband signals are, for example, quantized by linear quantization and then coded by entropy coding (refer to H. Gharavi and A. Tabatabai, "Sub-Band Coding of Monochrome and Color Images", IEEE Trans. on Circuits and Systems, Vol. 35, No. 2, February 1988, pp.207–214).

FIG. 9 shows an exemplary one of conventional image coding apparatus which perform subband division and entropy coding. Referring to FIG. 9, an input image signal is divided by subband division by a subband division section 1 to produce a plurality of subband signals, and each of the subband signals is quantized by a linear quantization section 6 so that a quantization index is outputted from the linear quantization section 6. Such quantization indices are coded by an entropy coding section 7.

In the image coding apparatus shown in FIG. 9, the entropy coding section 7 processes such that a short codeword is applied to a quantization index which appears frequently whereas a long codeword is applied to another quantization index which appears less frequently so that the entire code amount may be minimized. In other words, in order to determine the overall code amount, the frequency distribution of quantization indices must be found out.

However, there is no definite relational expression between the magnitude of the step width in linear quantization and the frequency distribution of quantization indices. Unless the step width is determined, the frequency distribution of quantization indices is not determined, but in order to determine the step width, the frequency distribution of quantization indices is required.

After all, in order to achieve accurate code amount control, recursive processing is required, and accordingly, the processing time cannot be calculated in advance.

In particular, as seen from FIG. 10, a temporary step width is determined temporarily (step 101), and the frequency distribution of quantization indices is calculated in accordance with the step width and then the code amount is estimated from the frequency distribution of quantization indices (step 102). Then, if the thus estimated code amount is excessively great, the step width is increased to decrease the code amount, but on the contrary if the estimated code amount is excessively small, the step width is decreased to increase the code amount. By such feedback operation, a step width with which an aimed code amount is obtained is determined.

However, when a step width is determined by such recursive processing, the processing time until a final step width is determined cannot be calculated in advance, and accordingly, there is a drawback in that the method cannot be applied to an apparatus in which the time required for coding is limited.

SUMMARY OF THE INVENTION

It is an object of the present invention to provide an image coding method by which accurate code amount control can be performed without the necessity of recursive processing.

In order to attain the object described above, according to an aspect of the present invention, there is provided an image coding method for an image coding apparatus which includes a subband division section for dividing an input image signal into a plurality of subband signals having frequency bands different from each other and having predetermined bit numbers distributed individually thereto, a subblock division section for dividing the subband signals obtained from the subband division section into a plurality of subblocks each having a spatial spread, a classification section for classifying the subband signals for each of the subblocks obtained from the subblock division section, a quantization section for quantizing the subband signals for each of the subblocks obtained from the subblock division section by linear quantization and outputting a quantization index, quantization by the quantization section being performed with a step width determined in response to a class outputted from the classification section, and a code allocation section for allocating the quantization index from the quantization section as a codeword, the image coding method comprising the steps of calculating, for each subblock, boundary points of the quantization step corresponding to the number of bits required for quantization in response to the dynamic range of signals of the subblock, rearranging the boundary points of the quantization steps of all of the subblocks in the class in order beginning with that of the greatest quantization step, and successively adding the corresponding bit numbers beginning with that of the greatest quantization step and determining the quantization step when the sum reaches a required bit number as the quantization step of the class for use in the quantization section.

In the image coding method, for each subblock, boundary points of quantization steps are calculated in response to dynamic ranges of signals. Processing for calculating the boundary points of the quantization steps for each subblock is performed for all of the subblocks. Then, the boundary points of the quantization steps of all of the subblocks are re-arranged in order beginning with that of the greatest quantization step, and the number of bits required for quantization is made correspond to each boundary point of each quantization step. Then, the corresponding bit numbers are successively added in order beginning with that one corresponding to the greatest quantization step, and the quantization step when the sum reaches the desired bit number is determined as a quantization step to be used by the quantization section. Consequently, the code amount is always kept fixed.

Thus, since required quantization numbers for quantization step widths are calculated for dynamic ranges of signals of all of subblocks and the step width is set so that the bit number may provide an aimed code amount, accurate code amount control can be performed without using recursive processing.

According to another aspect of the present invention, there is provided an image coding method for such an image coding apparatus as described above, the image coding method comprising the steps of determining representative values of dynamic ranges of signals of subblocks in advance, calculating boundary points of the quantization steps at the representative values of the individual dynamic ranges, re-arranging the boundary points of all of the quantization steps in order beginning with the highest value, replacing the dynamic ranges of all of the subblocks in the class with corresponding ones of the predetermined representative values, calculating a frequency distribution representing the numbers of the dynamic ranges of the representative values, and successively adding, in order beginning with the highest one of the boundary points of the quantization steps re-arranged in advance, products of bit numbers corresponding to the boundary points of the quantization steps and frequencies corresponding to the boundary points of the quantization steps and determining the quantization step when the sum reaches a desired bit number as a quantization step for the class to be used by the quantization section.

With the image coding method, since dynamic ranges of signals of individual subblocks are represented by representative values and a lookup table in which the relationship between such representative values and boundary values of step widths is written is used, the number of re-arrangements of the step widths is eliminated, and consequently, the overall processing time is reduced.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 1 is a block diagram of an image coding apparatus to which an image coding method according to the present invention is applied;

FIG. 2 is a diagrammatic view illustrating the subblock code structure;

FIG. 3 is a diagrammatic view illustrating the code structure of a subblock;

DESCRIPTION OF THE PREFERRED EMBODIMENT

Figure 4A:
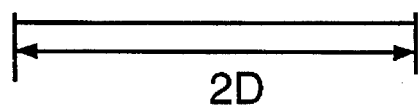
FIGS. 4A to 4D are diagrammatic views illustrating the relationship between the dynamic range and the quantization step.

Referring first to FIG. 1, there is shown an image coding apparatus to which an image coding method according to the present invention is applied. The image coding apparatus shown includes a subband division section 1 for dividing an input image signal into a plurality of subband signals having different frequency bands from each other, a subblock division section 2 for dividing a plurality of subband signals obtained from the subband division section 1 into a plurality of subblocks each having a spatial spread, a quantization section 3 for quantizing subband signals for each subblock obtained by division by the subblock division section 2 and outputting a quantization index, a classification section 4 for detecting a certain feature parameter of subband signals for each subblock obtained by division by the subblock division section 2 to classify the subband signals, and a code allocation section 5 for allocating a code to a quantization index from the quantization section 3. The quantization section 3 includes a plurality of quantizers having different quantization step widths, and a quantizer to be used is changed over for each subblock in response to a class index from the classification section 4.

Operation of the image coding apparatus described hereinabove with reference to FIG. 1 will be described subsequently.

An input image signal is divided into a plurality of subband signals by the subband division section 1. Here, the input image signal supplied to the subband division section 1 is a digital signal of the image intensity, and the subband signals are digital signals of the image intensity having different frequency bands. The subband signals from the subband division section 1 are divided into a plurality of subblocks each having a spatial spread as seen in FIG. 2. Here, an image area the input image signal has, image areas the subband signals have and image areas made by all of the subblocks correspond to one another in terms of the position. In the example of FIG. 2, the input image is divided into 144 (=12×12) subblocks, and a portion provided with slanting lines in FIG. 2 corresponds to one subblock.

In the classification section 4, each subband signal is classified in terms of a feature parameter, for example, a dispersion or a dynamic range, for each of the subblocks divided by the subblock division section 2, and a class index is outputted. In the quantization section 3, a quantizer to be used is changed over for each subblock in response to the class index from the classification section 4. In particular, a suitable step width is set for each class. In other words, the quantization section 3 functions as a dynamic range adaptive quantizer.

A code is allocated to a quantization index from the quantization section 3 by the code allocation section 5.

Here, if the code allocation section 5 allocates, upon allocation of codes to quantization indices, equal length codes irrespective of the numbers of appearances of the individual quantization indices, then the code amount can be estimated irrespective of the frequency distribution of the quantization indices. Accordingly, there is no necessity of performing recursive code amount control.

However, where equal length codes are allocated, the coding performance is deteriorated comparing with that where non-equal length codes are allocated. Thus, in the present invention, in order to avoid such deterioration of the coding performance, dynamic range adaptive linear quantization is performed for each subband.

In the following, the step width determination method and the coding method when such dynamic range adaptive linear quantization is performed will be described.

1. Such bit distribution as will satisfy an object total code amount is performed for each subband. Further, an aimed code amount is allocated to the class. A sum total of the aimed code amounts for the classes corresponds to the aimed code amount of the input image signal.

2. Each subband signal is divided into such spatial subblocks as shown in FIG. 2. Further, the subblocks are classified, and the number of subblocks is calculated for each class to calculate the number of subblocks, that is, the weight, of each class with respect to all of the subblocks.

3. Signals in the individual subblocks are quantized by linear quantization.

4. A quantization index of each subblock is used as it is as a codeword. In other words, codewords of quantization indices in a same subblock have an equal length. Consequently, the number of bits allocated to each subblock can be settled in advance.

5. For succeeding decoding processing, a dynamic range of the quantization index is multiplexed and coded as code length information of the subblock. FIG. 3 schematically shows a multiplexed code, and as seen in FIG. 3, a class index of a subblock which is an object for quantization and information (code length information) representing with what number of bits signals of the subblock are coded per one signal are added as overhead information of the subblock to code information representative of a quantization index of the subblock. By multiplexing a dynamic range of a quantization index with a code in this manner, a suitable quantization level number can be assured for each subblock.

While it is described in the foregoing description that bit distribution is performed for each subband, the unit for which bit distribution is performed is not limited to the subband, but bit distribution may be performed for each of a plurality of areas into which a subband is further divided spatially.

In the coding process of the image coding apparatus described above, it is required to determine a step width with which the code amount distributed to each subband can be satisfied.

In the following, two methods of determining the step width for linear quantization of each subband will be described. The first method represents a basic concept, and the second method is an improvement to the first method in that it reduces the amount of calculation in the first method.

First Method

Figure 4B:
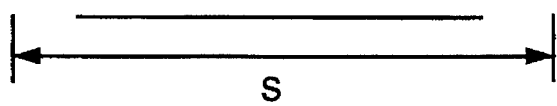
Figure 4C:
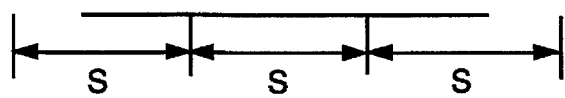
Figure 4D:
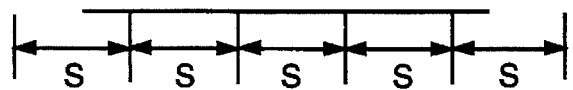

It is assumed now that a maximum value of an absolute value of signals in a certain subblock is D. In this instance, it is assumed that the dynamic range is from −D to D, that is, 2D (refer to FIG. 4A). Further, the step size when a signal whose dynamic range is 2D is quantized by linear quantization in a mid tread is represented by s. When signals of the subblock are to be coded with an integral number of bits, the relationship between the number of bits required for quantization and the magnitude of the step size is given by bit number 0 s=2D or more (refer to FIG. 4B)

bit number 2 s=2D/3 to 2D (refer to FIG. 4C)

bit number 3 s=2D/7 to 2D/3 (refer to FIG. 4D)

The step size at a boundary point then is 2D, 2D/3, 2D/7, ..., or $2D/(2^m-1)$ (m is a natural number). The bit number increment at the first boundary point (s=2D) is 2 bits, and the bit number increment at each of the following boundary points is 1 bit.

Figure 5:
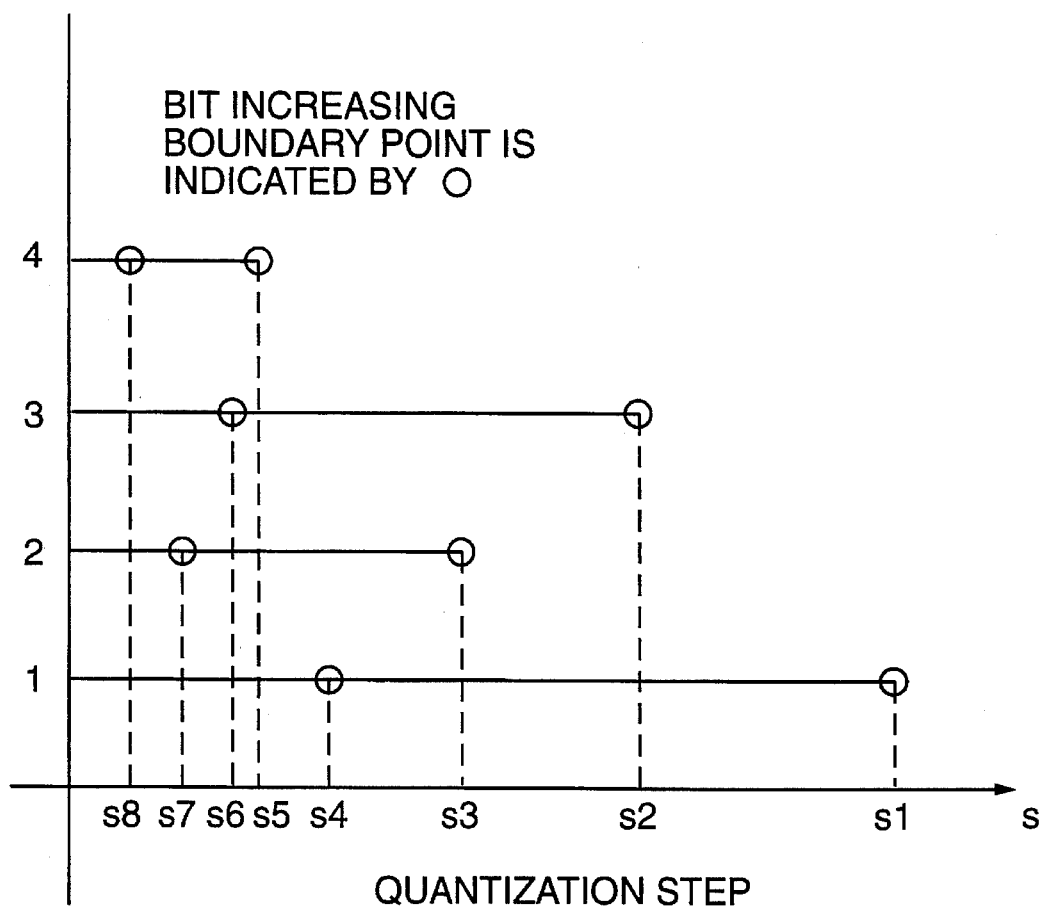
FIG. 5 is a diagram showing boundary points at which the number of bits required for quantization increases.
Figure 6:
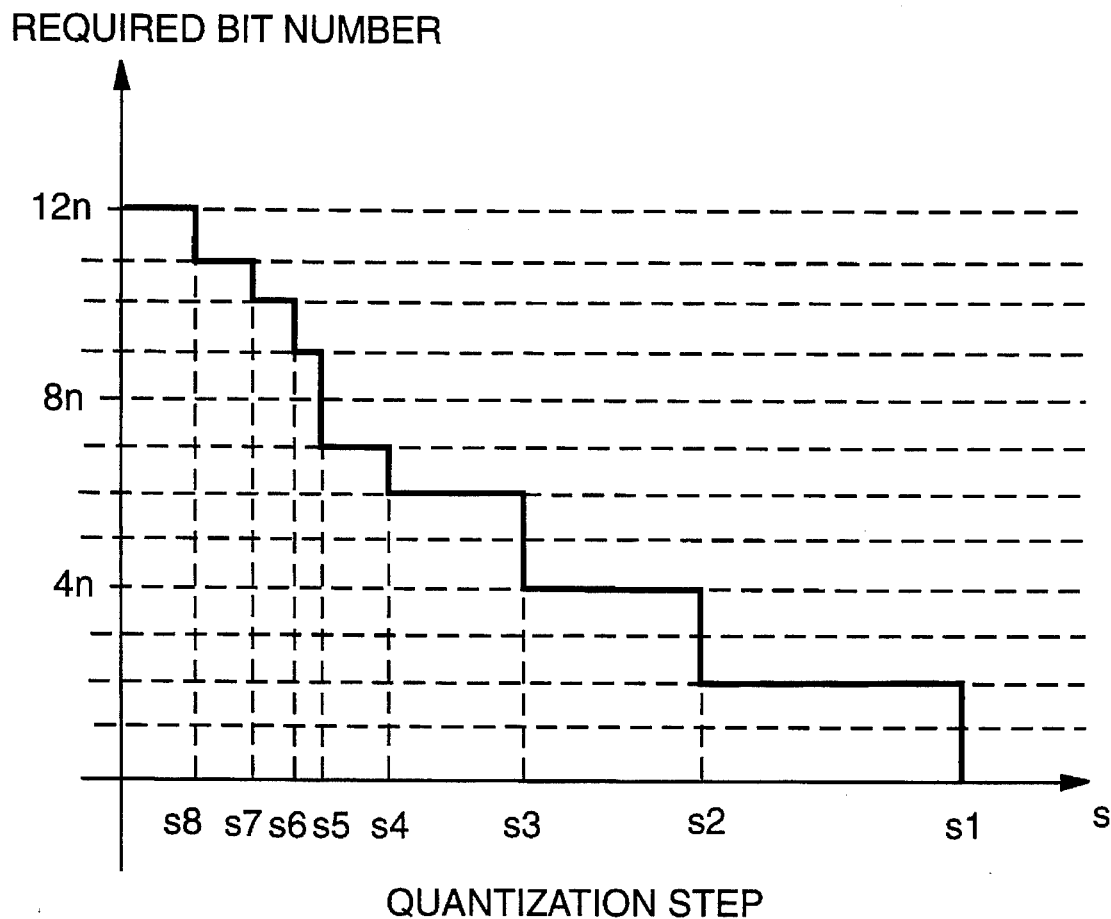
FIG. 6 is a graph illustrating the relationship between the required bit number and the step width.
Figure 7:
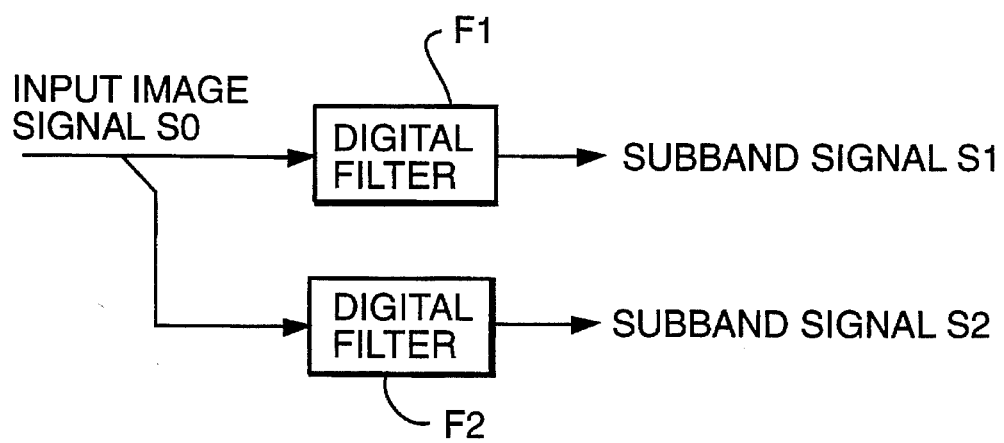
FIG. 7 is a block diagram showing the construction for performing subband division.
Figure 8A:
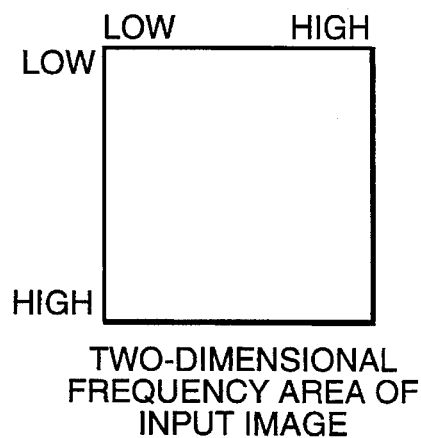
FIGS. 8A and 8B are diagrammatic views illustrating subband division.
Figure 8B:
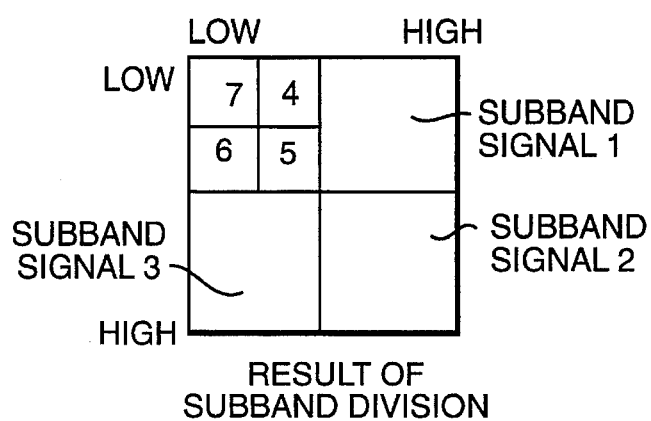
Figure 9:
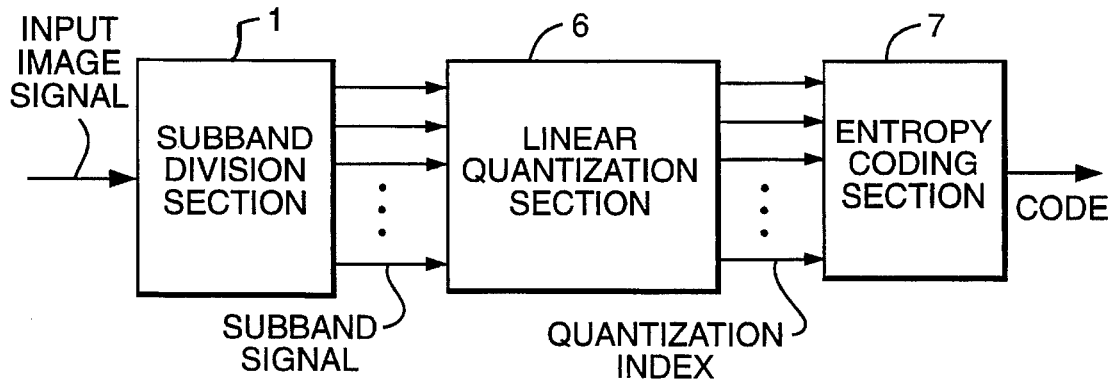
FIG. 9 is a block diagram showing a conventional image coding apparatus which makes use of subblock division.
Figure 10:
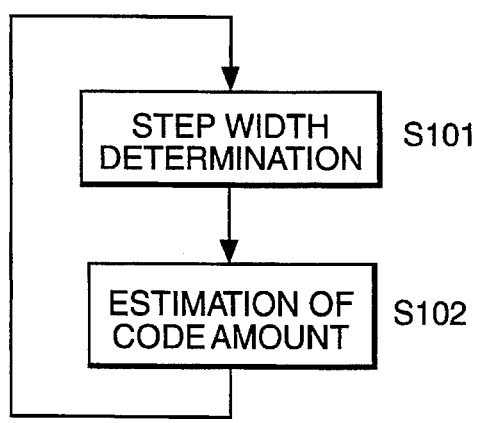
FIG. 10 is a flow chart illustrating the procedure of control amount control in a conventional image coding apparatus.

For example, in order to code a subblock whose magnitude of the dynamic range is 2D with 2 bits per one signal, the step size s should be set to s=2D/3.

Where a plurality of subblocks are involved, they have dynamic ranges of different magnitudes. Therefore, the step width at a boundary point at which the number of bits required for quantization increases is present for each subblock (refer to FIG. 5). In the example illustrated in FIG. 5, it is shown, for simplification, such that the number of subblocks is 4 and quantization is performed with 3 bits in the maximum per one signal. In FIG. 5, each round mark indicates a boundary point at which the number of bits required increases. Reference characters $s1, s2, \ldots$, and $s8$ in the graph of FIG. 5 represent sequential numbers applied to all bit increasing boundary points of the four subblocks beginning with that one which has a maximum step width.

Where the number of signals (picture elements) of each subblock is n, the required bit number when the step size varies exhibits such a variation as shown in FIG. 6. In particular, an aimed code amount is determined for each class, and the relationship between the step width and the required bit number which satisfies such aimed code amount is such as illustrated in FIG. 6. In particular, where the step width is great, the required bit number is small, but where the step width is small, the required bit number is great. Accordingly, if graphs similar to FIG. 6 are drawn using all of the subblocks, then a step width which satisfies an aimed bit number can be found out conversely.

In the first method described above, when the subblock number is p and quantization is performed with q bits in the maximum, in order to draw the graph of FIG. 6, re-arrangement of pq elements must be performed. For such re-arrangement of pq elements, approximately $pq\log_2(pq)$ comparison calculations are generally required. Where the subblock number is great, the load by the processing is considerably high. A second method which moderates the load by the processing will be described subsequently.

Second Method

In the first method described above, $pq\log_2(pq)$ re-arrangement processes are required since no value of the dynamic range is known in advance. However, if the values of the dynamic ranges are limited to definite representative values, then re-arrangement processing can be performed in advance, and consequently, the amount of calculation upon actual coding can be reduced.

The calculation procedure will be described below.

First, the dynamic range of each of the subblocks is represented by a value nearest to it from among a plurality of representative values determined in advance. Then, a frequency distribution of the representative values is calculated. Then, the numbers of bits required to code the representative values of the individual dynamic ranges are multiplied by the frequencies to calculate the total bit number.

According to the second method, since the representative values are determined in advance, re-arrangement processing can be performed in advance irrespective of image data, and consequently, the amount of calculation is reduced comparing with that by the first method.

In the second method, such a lookup table wherein boundary points of step widths regarding the representative values of all of the dynamic ranges are arranged beginning with a highest value one as seen in Table 1 below is produced. The lookup table is provided in the quantization section 3. As described also in the description of the first method above, the increment of the number of bits when the step width is decreased is either 1 or 2 (refer to FIG. 6). Consequently, it is also described in the lookup table at which dynamic range and by what number the representative value exhibits an increase.

TABLE 1

| Boundary Point of Step Width | Index of Dynamic Range | Increased Bit Number |
| --- | --- | --- |
| s1 | i1 | 2 |
| s2 | i2 | 2 |
| s3 | i3 | 2 |
| s4 | i4 | 1 |
| . | . | . |
| . | . | . |
| . | . | . |

Subsequently, an example of calculation of a step width using the lookup table given above will be described.

First, a frequency distribution of the representative values of the dynamic ranges is calculated. Then, the indices of the representative values of the dynamic ranges are represented by $i_k$ (where k=1, 2, 3, . . .). Here, the number of subblocks with which the index of the representative value of the dynamic range is i is represented by $n(i_k)$.

The required number of 1 bits is:

at the step width s1, $2 \times n(i1)$ bits;

at the step width s2, $2 \times n(i1) + 2 \times n(i2)$ bits;

at the step width s3, $2 \times n(i1) + 2 \times n(i2) + 2 \times n(i3)$ bits; and at the step width s4, $2 \times n(i1) + 2 \times n(i2) + 2 \times n(i3)$ bits + $1 \times n(i1)$ bits.

In this manner, bit numbers are successively added beginning with that for the greatest step width, and a step width when the sum reaches a bit number for an object is determined as a step width for an object.

According to the second method described above, a step width for obtaining an object code amount can be calculated without performing recursive processing and besides with a comparatively small amount of calculation.

Having now fully described the invention, it will be apparent to one of ordinary skill in the art that many changes and modifications can be made thereto without departing from the spirit and scope of the invention as set forth herein.

What is claimed is:

1. An image coding method for an image coding apparatus which includes a subband division section for dividing an input image signal into a plurality of subband signals having frequency bands different from each other and having predetermined bit numbers distributed individually thereto, a subblock division section for dividing the subband signals obtained from said subband division section into a plurality of subblocks each having a spatial spread, a classification section for classifying the subband signals for each of the subblocks obtained from said subblock division section, a quantization section for quantizing the subband signals for each of the subblocks obtained from said subblock division section by linear quantization and outputting a quantization index, quantization by said quantization section being performed with a step width determined in response to a class outputted from said classification section, and a code allocation section for allocating the quantization index from said quantization section as a codeword, said image coding method comprising the steps of:

calculating, for each subblock, boundary points of the quantization step corresponding to the number of bits required for quantization in response to the dynamic range of signals of the subblock;

re-arranging the boundary points of the quantization steps of all of the subblocks in the class in order beginning with that of the greatest quantization step; and successively adding the corresponding bit numbers beginning with that of the greatest quantization step and determining the quantization step when the sum reaches a required bit number as the quantization step of the class for use in said quantization section.

2. An image coding method for an image coding apparatus which includes a subband division section for dividing an input image signal into a plurality of subband signals having frequency bands different from each other and having predetermined bit numbers distributed individually thereto, a subblock division section for dividing the subband signals obtained from said subband division section into a plurality of subblocks each having a spatial spread, a classification section for classifying the subband signals for each of the subblocks obtained from said subblock division section, a quantization section for quantizing the subband signals for each of the subblocks obtained from said subblock division section by linear quantization and outputting a quantization index, quantization by said quantization section being performed with a step width determined in response to a class outputted from said classification section, and a code allocation section for allocating the quantization index from said quantization section as a codeword, said image coding method comprising the steps of:

determining representative values of dynamic ranges of signals of subblocks in advance;

calculating boundary points of the quantization steps at the representative values of the individual dynamic ranges;

re-arranging the boundary points of all of the quantization steps in order beginning with the highest value;

replacing the dynamic ranges of all of the subblocks in the class with corresponding ones of the predetermined representative values;

calculating a frequency distribution representing the numbers of the dynamic ranges of the representative values; and successively adding, in order beginning with the highest one of the boundary points of the quantization steps re-arranged in advance, products of bit numbers corresponding to the boundary points of the quantization steps and frequencies corresponding to the boundary points of the quantization steps and determining the quantization step when the sum reaches a desired bit number as a quantization step for the class to be used by said quantization section.

* * * * *